UNITED STATES PATENT OFFICE.

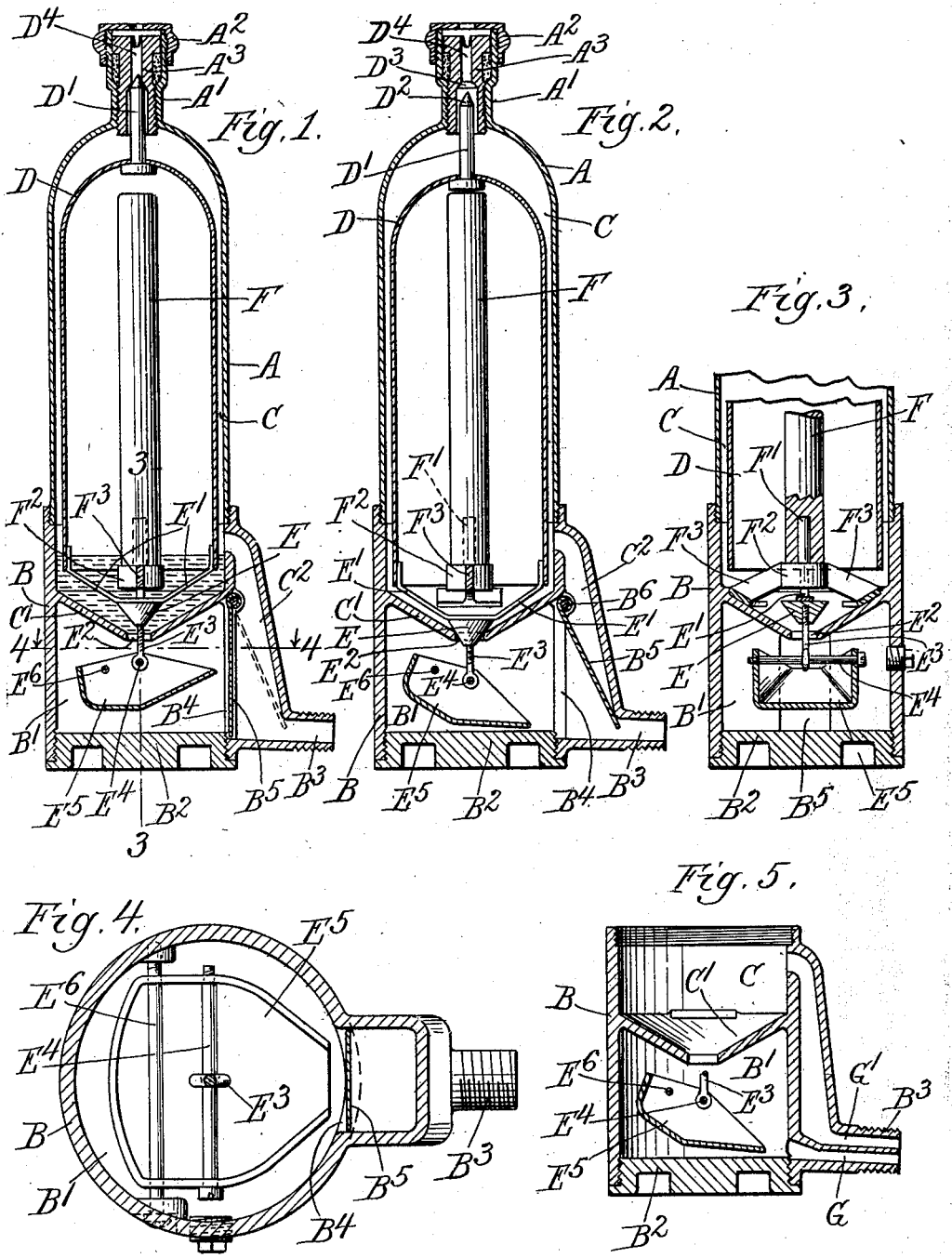

CHARLES E. NORMAN, OF CHICAGO, ILLINOIS.

AIR-VALVE.

991,530.

Specification of Letters Patent. Patented May 9, 1911.

Application filed February 21, 1910. Serial No. 545,008.

*To all whom it may concern:*

Be it known that I, CHARLES E. NORMAN, a citizen of the United States, residing at Chicago, in the county of Cook and State of Illinois, have invented a certain new and useful Improvement in Air-Valves, of which the following is a specification.

My invention relates to improvements in air valves, and is illustrated in the accompanying drawings, wherein—

Figure 1 is a section showing the valve closed; Fig. 2, a section showing the valve open; Fig. 3, a section along the line 3—3 of Fig. 1; Fig. 4, a section along the line 4—4 of Fig. 1; Fig. 5, a sectional view of a modification.

Like parts are indicated by like letters in all the figures.

The casing A has at its top the sleeve $A^1$, which is provided with the screw-threaded cap $A^2$ and screw-threaded plug $A^3$. The base B has the chamber $B^1$ which is closed at the bottom by the screw-threaded plug $B^2$ and communicates with the pipe $B^3$ by means of the opening $B^4$, and is adapted to be separated therefrom by the door $B^5$ rotating about the rod $B^6$. The casing A and the base B inclose a chamber C which is separated from the chamber $B^1$ by the funnel-shaped partition $C^1$ and which communicates with the pipe $B^3$ by means of the passageway $C^2$. The float D carries the valve rod $D^1$ having at its top the valve $D^2$ adapted to engage the valve seat $D^3$ in the plug $A^3$ and to close the passageway $D^4$. The valve E supported upon the float D by means of the members $E^1$ is adapted to close the opening $E^2$ in the partition wall $C^1$, and carries the rod $E^3$ which is connected by means of the shaft $E^4$ with the bucket $E^5$ which is mounted upon the shaft $E^6$ within the chamber $B^1$. The expansion member F is supported by means of the rod $F^1$, collar $F^2$ and arms $F^3$ upon the base B.

In the modification illustrated in Fig. 5 the connection between the pipe $B^3$ and the chambers $B^1$ and C is by means of the passageways G, $G^1$ instead of the passageway $C^2$ and opening $B^4$.

It will, of course, be evident that while I have shown in my drawings an operative device, still many changes might be made in the arrangement, shape and size of the parts without departing materially from the spirit of my invention, and I wish, therefore, that my drawings be considered as diagrammatic.

The use and operation of my device are as follows: I provide an air valve having the usual float and expansion member, but in addition I provide means for positively retracting the float to prevent its becoming stuck within the casing when in a closed position. These means comprise a chamber below the float chamber, a valve connection between such chambers and a water receptacle within such lower chamber, said receptacle adapted to be filled with water from the upper chamber when the air valve is in its closed position and when so filled to draw down the float in such manner as to open the air valve. I provide means for the egress of water from such auxiliary chamber comprising a swinging door which door is closed during the movement of the air through the air valve and open only when such movement has ceased and water is being discharged from the float chamber. In order to provide place for the valve connection between such chambers it is necessary to change in some way the support for the expansion member and this I have done by supporting the member upon a plurality of arms bearing upon the walls of the supporting base.

In the modification I provide two passages instead of the one and do away with the swinging door.

I claim:—

1. In an air valve the combination with a casing, float and valve member of automatic means in addition to the weight of the float and valve member for positively unseating said valve member.

2. In an air valve the combination with a casing, float and valve member of water-actuated means in addition to the weight of the float and valve member for positively unseating said valve member.

3. In an air valve the combination with a casing, float and valve member of intermittently operative automatic means in addition to the weight of the float and valve member for positively unseating said valve member.

4. In an air valve the combination with a casing, float and valve member of intermittently operative water-actuated means in addition to the weight of the float and valve member for positively unseating said valve member.

5. In an air valve the combination with a casing, float and valve member of automatic means in addition to the weight of the float and valve member for positively unseating said valve member, said means including a plurality of chambers, one of said chambers containing the float.

6. In an air valve, the combination with a casing, float and valve member, of means for positively unseating said valve member, said means including a plurality of chambers, one of said chambers containing the float, the other containing a pivotally mounted bucket and a valve between such chambers.

7. In an air valve, the combination with a casing, float and valve member, of means for positively unseating said valve member, said means including a plurality of chambers, one of said chambers containing the float, the other containing a pivotally mounted bucket and a valve between such chambers, said bucket and said valve attached to the float.

8. In an air valve, the combination with a casing, float and valve member, of automatic means in addition to the weight of the float and valve member for positively unseating said valve member, said means including a plurality of chambers, one of said chambers containing the float, a supporting pipe for the casing and passages from said pipe to each of the chambers.

9. In an air valve, the combination with a casing, float and valve member, of means for positively unseating said valve member, said means including a plurality of chambers, one of said chambers containing the float, a supporting pipe for the casing and passages from said pipe to each of the chambers, one of said passages adapted to be closed when the other is opened.

10. In an air valve, the combination with a casing, float and valve member, of means for positively unseating said valve member, said means comprising a bucket eccentrically pivoted and a connection from said bucket to the float.

11. An air valve comprising a casing, valve member, float, and supporting pipe, a plurality of chambers within such casing, each connected to said pipe, and having a passage between them, one of them containing the float, the other a pivotally mounted bucket.

12. An air valve comprising a casing, valve member, float, and supporting pipe, a plurality of chambers within such casing, each connected to said pipe, and having a passage between them, one of them containing the float, the other a pivotally mounted bucket, a connection between said float and said bucket and a valve member upon such connection to close said passage.

13. An air valve comprising a casing, valve member, float and supporting pipe, a plurality of chambers within such casing, each connected to said pipe, and having a passage between them, one of them containing the float, the other a pivotally mounted bucket, a connection between said float and said bucket and a valve member upon such connection to close said passage, and means for closing the connection from one of said chambers to said pipe.

14. In an air valve the combination with a casing, float and valve member of automatic means attached to the float for positively unseating the valve member.

15. In an air valve the combination with a casing, float and valve member of water-actuated means attached to the float for positively unseating the valve member.

16. In an air valve the combination with a casing, float and valve member of intermittently operative automatic means attached to the float for positively unseating the valve member.

17. In an air valve the combination with a casing, float and valve member of water-atcuated means attached to the float for positively unseating the valve member, said means intermittently operative.

18. An air valve having a float, a float chamber, said chamber having a conical, centrally perforated bottom, a valve mounted upon said float and adapted to engage said perforation an air valve mounted upon said float in opposition to a seat at the top of the float chamber and a bucket beneath said perforation.

19. An air valve comprising a casing, valve member, float and supporting pipe, a plurality of chambers within such casing, each connected to said pipe, and having a passage between them, one of them containing the float, the other a pivotally mounted bucket, a connection between said float and said bucket, and a valve member upon such connection to close said passage attached to said float.

CHARLES E. NORMAN.

Witnesses:
LUCY A. FALKENBERG,
MINNIE M. LINDENAU.